(12) United States Patent
Kaminski et al.

(10) Patent No.: US 7,755,514 B2
(45) Date of Patent: *Jul. 13, 2010

(54) PRECISION APPROACH PATH INDICATOR SYSTEMS AND LIGHT ASSEMBLIES USEFUL IN SAME

(75) Inventors: Mark Kaminski, Tucson, AZ (US); Matthew B. Dubin, Tucson, AZ (US); Michael Frate, Tucson, AZ (US)

(73) Assignee: New Bedford Panoramex Corp., Upland, CA (US)

(*) Notice: Subject to any disclaimer, the term of this patent is extended or adjusted under 35 U.S.C. 154(b) by 165 days.

This patent is subject to a terminal disclaimer.

(21) Appl. No.: 11/973,961

(22) Filed: Oct. 10, 2007

(65) Prior Publication Data

US 2008/0036625 A1    Feb. 14, 2008

Related U.S. Application Data

(63) Continuation of application No. 11/210,191, filed on Aug. 22, 2005, now Pat. No. 7,375,653.

(51) Int. Cl.
*B64F 1/18* (2006.01)

(52) U.S. Cl. .................. 340/955; 340/953; 362/545; 362/560

(58) Field of Classification Search ......... 340/953–956, 340/815.45, 980, 982; 362/545, 559, 560, 362/800
See application file for complete search history.

(56) References Cited

U.S. PATENT DOCUMENTS

| | | | |
|---|---|---|---|
| 2,390,109 A | | 12/1945 | Liebmann |
| 3,537,066 A | * | 10/1970 | Stingl ............... 340/953 |
| 4,063,218 A | * | 12/1977 | Basov et al. ........... 340/951 |
| 4,170,767 A | | 10/1979 | Tanner |
| 4,532,512 A | * | 7/1985 | Tanner ............... 340/950 |
| 4,707,696 A | * | 11/1987 | Task et al. ............ 340/954 |
| 5,287,104 A | | 2/1994 | Shemwell |

(Continued)

FOREIGN PATENT DOCUMENTS

JP    2000029135 A    1/2000

OTHER PUBLICATIONS

Airport Technology R & D Branch, "Temporary Installation of PAPI/A—PAPI Systems", http://www.airporttech.tc.faa.gov/safety/papi.asp, Apr. 25, 2005.

(Continued)

*Primary Examiner*—Davetta W Goins
*Assistant Examiner*—Anne V Lai
(74) *Attorney, Agent, or Firm*—Stout, Uxa, Buyan & Mullins, LLP; Frank J. Uxa

(57) ABSTRACT

Precision approach path indicator systems (PAPIs) effective in providing approach slope guidance for aircraft approaching an airport runway are provided. Such PAPIs include a plurality of light assemblies positioned on or in proximity to an airport runway and structured or configured to be effective in providing approach slope guidance light signals to a pilot of an aircraft approaching a runway. Each light assembly includes a light source comprising light emitting diodes (LEDs), preferably a first array of LEDs and a second array of LEDs.

18 Claims, 2 Drawing Sheets

U.S. PATENT DOCUMENTS

| | | |
|---|---|---|
| 5,806,965 A | 9/1998 | Deese |
| 5,927,845 A | 7/1999 | Gustafson et al. |
| 6,168,294 B1 | 1/2001 | Erni et al. |
| 6,320,516 B1 * | 11/2001 | Reason ..................... 340/953 |
| 6,354,714 B1 | 3/2002 | Rhodes |
| 6,509,844 B1 * | 1/2003 | Eyring ..................... 340/954 |
| 6,688,755 B2 | 2/2004 | O'Meara |
| 6,711,479 B1 * | 3/2004 | Staggs ..................... 701/16 |
| 6,879,263 B2 * | 4/2005 | Pederson et al. ....... 340/815.45 |
| 7,023,361 B1 * | 4/2006 | Wallace et al. ............. 340/952 |
| 7,072,096 B2 | 7/2006 | Holman et al. |
| 7,083,315 B2 | 8/2006 | Hansler et al. |
| 2001/0046133 A1 | 11/2001 | Ramer et al. |
| 2002/0099528 A1 | 7/2002 | Hett |
| 2002/0136027 A1 | 9/2002 | Hansler et al. |
| 2002/0159265 A1 | 10/2002 | Rizkin et al. |
| 2003/0132860 A1 | 7/2003 | Feyereisen et al. |
| 2004/0095777 A1 | 5/2004 | Trenchard et al. |
| 2006/0083017 A1 * | 4/2006 | Wang et al. ................. 362/547 |
| 2006/0119839 A1 | 6/2006 | Bertin et al. |
| 2006/0125658 A1 * | 6/2006 | Dohler et al. ............... 340/951 |

OTHER PUBLICATIONS

Honeywell Airport Systems, "Precision Approach Path Indicators (PAPI) Product Overview", http://airportsystems.honeywell.com/airfieldlighting/productfamilies . . . , Apr. 25, 2005.

PAPI Research Engineers, Research Engineers Precision Approach Path Indicator (PAPI), http://www.research-engineers.com/, May 17, 2005.

PAPI by Research Engineers, About PAPI, http://www.research-engineers.com/aboutpapi.htm, May 17, 2005.

PAPI by Research Engineers, Pilots View, http://www.research-engineers.com/pilotsview.htm, May 17, 2005.

Instruction Book, Precision Approach Path Indicator (PAPI), by New BedFord Panoramex Corporation (NBP), Prepared for U.S. Department of Transportation, Federal Aviation Administration (FAA), Aug. 19, 2003.

USPTO Office Action dated May 1, 2007 in U.S. Appl. Serial No. 11/210,191.

* cited by examiner

PRECISION APPROACH PATH INDICATOR SYSTEMS AND LIGHT ASSEMBLIES USEFUL IN SAME

CROSS-REFERENCE TO RELATED APPLICATIONS

This application is a continuation of U.S. application Ser. No. 11/210,191, filed Aug. 22, 2005, the disclosure of which is hereby incorporated in its entirety herein by this reference.

BACKGROUND OF THE INVENTION

The present invention relates to precision approach path indicator systems (PAPIs) used in airports to provide approach slope guidance for aircraft approaching an airport runway, and light assemblies useful in such systems. More particularly, the present invention relates to PAPIs and light assemblies for use therein which provide substantial and important advantages and/or benefits relative to the prior art systems and assemblies.

Precision approach path indicator systems (PAPIs) are known airport lighting aids. As commonly employed, PAPIs use a single row of either two or four light units including halogen or similar lamps. The row of either two or four identical light units is placed on one side of the runway in a line perpendicular to the runway centerline to define the visual glide path angle. The light units each have a white segment in an upper part of the beam and red segment in a lower part of the beam separated by a pink transition zone. In the two-light system, for example, a Type L-881 system, the lights are positioned and aimed to produce a signal presentation wherein a pilot on or close to the established approach path sees the light unit nearest the runway as red and the other light unit as white. When above the approach path the pilot sees both light units as white; and when below the approach path the pilot sees both light units as red.

In the four-light system, for example, Type L-880, PAPI system, the signal presentation is such that a pilot on or close to the established approach path sees the two light units nearest the runway as red and the two light units farthest from the runway as white. When above the approach path the pilot sees the light unit nearest the runway as red and the three light units farthest from the runway as white; and when further above the approach path the pilot sees all the light units as white. When below the approach path the pilot sees the three light units nearest the runway as red and the light unit farthest from the runway as white; and when further below the approach path the pilot sees all light units as red.

The visual glide path angle provided by the PAPI is the center of the on-course zone, and is normally 3 degrees (of an arc) when measured from the horizontal, but may vary, for example, if jet aircraft are supported by the airport, if obstacles to flight are located at the airport, or if elevated terrain affects the approach to the airport. Other considerations in siting the PAPIs indicator lights include whether the terrain drops off rapidly near the approach threshold, and whether severe turbulence is experienced on approach. On short runways, the PAPI system indicator lights are located as near the threshold as possible to provide the maximum amount of runway for braking after landing. Thus, the PAPI system indicator lights are often positioned and aimed to produce a minimum Threshold Crossing Height (TCH), which is the height of the lowest on-course signal at a point directly above the intersection of the runway centerline and the threshold, and clearance over obstacles in the approach area.

PAPIs are very useful in providing approach slope guidance to aircraft approaching an airport. However, certain problems do exist. For example, the halogen or similar lamps used in the prior art PAPIs are relatively costly to operate and, in addition, have a relatively limited useful life. Although the lighting assemblies of such PAPIs are structured to facilitate relatively rapid lamp replacement, the cost of maintenance, particularly the cost and inconvenience of closing an airport runway in order to change lamps, represents a significant disadvantage to using such PAPIs. In addition, since providing accurate approach path guidance is very important in maintaining the safety of airport operation, lamps which become ineffective after relatively short periods of operation, even if they are relatively easy to replace, can create a significant detriment to airport safety.

There is a need for new PAPIs, for example new PAPIs which address one or more of the problems or disadvantages of the prior art PAPIs.

SUMMARY OF THE INVENTION

New precision approach path indicator systems or PAPIs and new light assemblies useful in PAPIs have been discovered. The new PAPIs and light assemblies are relatively straightforward in construction; and meet or exceed substantially all the regulatory requirements and specifications, for example, imposed by the U.S. Federal Aviation Administration (FAA), on the operation and structure of PAPIs and light assemblies used therein. Moreover and advantageously, the present PAPIs and light assemblies are less costly to install and/or operate and/or maintain relative to the prior art PAPIs, and/or are more reliable in operation relative to the prior art PAPIs.

In one broad aspect of the present invention, precision approach path indicator systems (PAPIs) effective in providing approach slope guidance for aircraft approaching an airport runway are provided. Such PAPIs comprise a plurality of light assemblies positioned on or in proximity to an airport runway and structured or configured to be effective in providing approach slope guidance light signals to a pilot of an aircraft approaching a runway. In a preferred embodiment of the invention, each light assembly includes a first and second light source; particularly preferably such light source comprises light emitting diodes (LEDs), for example, at least one first LED and at least one second LED, such as a first array of LEDs and a second array of LEDs. The first array of LEDs includes at least one first LED, and preferably a plurality of first LEDs. Similarly, the second array of LEDs includes at least one second LED, preferably a plurality of second LEDs. As indicated above, the present invention contemplates the use of light sources, and assemblies comprising light sources, other than LEDs that share one or more of the advantages thereof: for example, without limitation, a low power requirement (thus resulting in reduced costs of operation); high efficiency conversion of electric to radiant energy; and long and reliable operation with minimal maintenance.

The present PAPIs may be advantageously located and used in substantial accordance with the procedures used to locate and use the prior art PAPIs, for example as described elsewhere herein and/or is commonly understood by those of ordinary skill in the art. Importantly, in a preferred embodiment the present PAPIs include light assemblies comprising LEDs. Such LEDs are very effective in providing the required light for operation of the present PAPIs in a cost effective and reliable manner. In particular, PAPIs and light assemblies that include LED-containing and similar light sources may often be operated at reduced cost and/or increased reliability relative to the halogen lamps employed in prior art PAPIs, for example, PAPIs including halogen lamps.

In a further broad preferred aspect of the present invention, assemblies, for example light assemblies for use in an airport approach path indicator system, for example, the present PAPIs, are provided. Such light assemblies comprise a mirror component including first and second, preferably substantially planar, mirrored surfaces positioned to meet at an angle of about 90°. In this preferred embodiment, first and second spaced apart light emitting diodes (LEDs) are located so that the at least one first LED emits light reflected by the first mirrored surface and the at least one second LED emits light reflected by the second mirrored surface. A projection lens is provided and is positioned to allow light reflected by the first and second mirrored surfaces to pass therethrough.

It will be apparent to one of ordinary skill in the art that the mirrored surfaces, while preferably substantially planar, may be somewhat curved in certain embodiments of the present invention. For a single element projection lens, the best focus occurs on a curved surface; thus in such other embodiments of the invention the mirrored surfaces may have a slight curve.

In addition, while the preferred embodiment comprises mirrored surfaces positioned at angles of about 90° to each other, those of ordinary skill in the art will appreciate that any geometry in which light from the first and second light source is reflected from the first and second mirrored surfaces, respectively, toward the projection lens is within the ambit of the present invention so long as substantially no light from the first light source is reflected from the second mirrored surface toward the projection lens, or vice versa.

The first and second mirrored surfaces preferably meet at a substantially straight edge. The mirror component is advantageously positioned relative to the first and second LEDs so that the first mirrored surface and the second mirrored surface reflects light emitted from substantially only the first LED or LEDs and the second LED or LEDs, respectively. It is possible to make a PAPI device according to the present invention such that substantially all the light emitted by the one or more light source located near each of the mirrored surfaces is reflected by that mirrored surface, with little, if any, light missing the mirrored surface. However, to make such a device would require quite high tolerances. In other embodiments, a portion of the light emitted by said one or more light source may be directed past the mirror without being reflected thereby into the projection lens. It is preferable that the amount of such light be minimized.

A "substantially straight edge" includes an edge that is substantially perpendicular to the direction of the light reflected toward the projection lens. In one embodiment of the present invention, the intersection of the two mirrored surfaces may form a somewhat curved or rounded edge rather than a sharp edge.

In one embodiment, the mirror component is positioned relative to the first and second light sources so that light emitted by the first light source or assembly contacts the first mirrored surface at an angle of about 45° relative to the first mirrored surface, and light emitted from the second light source or assembly contacts the second mirrored surface at an angle of about 45° relative to the second mirrored surface. Preferably the light source or assemblies comprise one or more LED, more particularly a plurality of LEDs.

A substantially sharp angular cutoff between the light projected from the first and second mirrored surfaces may be created when the substantially straight edge is placed proximal to the focal plane of the projection lens such that the first light source illuminates a portion of the first mirrored surface that includes the substantially straight edge, and the second light source illuminates a portion of the second mirrored surface that includes the substantially straight edge. When the substantially straight edge is placed proximal to the focal plane of the projection lens there is preferably a sharp angular transition between the light projected from the first light source and the second light source.

As noted above, the first and second mirrored surfaces of the present light assemblies preferably are substantially planar. In certain prior art PAPIs, hyperbolic mirrors are employed to reflect light from halogen and similar lamps. Hyperbolic mirrors are, by definition, not planar. In the present preferred light assemblies, it is substantially advantageous that the first and second mirror surfaces be substantially planar, for example, to aid in providing the desired orientation of the light passing through the projections lamps.

When the present invention comprises the use of light emitting diodes, at least one and preferably each of such LEDs in each of the arrays of LEDs preferably is equipped with a collimating optic. In a particularly preferred embodiment of the invention the LEDs are equipped with an encapsulated optic. By encapsulated optic is meant an assembly that collects as much light as is practical or necessary from the source and typically at least partially surrounds and covers the light source. In the present invention the preferred embodiment for an encapsulated optic is a catadioptric optic utilizing refractive and internal reflecting surfaces.

Light from the encapsulated optic reflects off the mirror and passes through the image plane of the projection lens. The encapsulated optic collects as much light as possible while maintaining Etendue efficiency and minimum encapsulated optic diameter. Etendue efficiency determines how much light fills the aperture of the projection lens (for a given lens diameter). The minimum optic diameter determines how closely the encapsulating optics are placed together. This is preferably considered particularly carefully in the high intensity zone, because enough light must pass through the image plane in the center to meet optimal PAPI intensity requirements. Like the collimating optics the encapsulated optic may be optimized. Such LEDs with collimating optics are well known and are commercially available. The use of LEDs with collimating optics is advantageous in that the light emitted by the LED is focused toward the mirror component so that a substantial portion, for example a major portion, that is at least about 50%, or even substantially all, of the light emitted by the LED is focused toward the mirror component.

The at least one first LED or the first array of LEDs advantageously emits light having a first color, for example, the first color may be white, and the at least one second LED or the second array of LEDs emits light having a second color different from the first color, for example, the second color may be red. The first and second colors being white and red, respectively, is very advantageous in that such colors facilitate employing the present PAPIs in place of prior art PAPIs without substantial re-education of the airport staff or pilots.

The number of LEDs that may be included in each first array of LEDs and second array of LEDs may be any suitable number effective to provide the desired light signals. As noted elsewhere herein, an array of LEDs includes at least one LED. In one embodiment, the first and second arrays of LEDs each include a number of LEDs in a range of about 2 to about 60 or more. The brightness obtainable from individual LEDs has continually increased in the past up to the present time. If this brightness trend continues the number of LEDs in each of the first and second arrays may be reduced. Light assemblies including a single first LED and/or a single second LED are within the scope of the present invention.

The present light assemblies preferably further comprise a spreader lens. A spreader can be placed on the other side of the lens or even comprise a part of the projection lens, however in a preferred embodiment the spreader is positioned so that light reflected by the first and second mirrored surfaces passes through the spreader lens prior to passing through the projection lens. The spreader redirects light in the horizontal direction to conform with intensity and distribution requirements. The spreader permits the pilot to see the PAPI when the airplane is "off axis" in the horizontal direction. The spreader lens may also be effective in diffusing the individual, relatively focused beams of light emitted from the first and second arrays of LEDs (or other similar light sources) (each array including a plurality of LEDs). Again, this feature facilitates the replacement of the prior art PAPIs with the present PAPIs with a minimum of disruption to the operation of the airport and the safety of the aircraft landing there.

The present light assemblies advantageously further comprise a housing sized and structured to at least partially contain the first and second light sources (preferably LEDs), the mirror component and the projection lens. It is important that the projection lens be located relative to the housing so that light passing from the mirror component through the projection lens can be seen by pilots and/or other aircraft crew members, as needed to receive the approach slope guidance offered by the present PAPIs.

In one embodiment, the present light assemblies further comprise an angle adjustment subassembly operatively coupled to the housing and structured to maintain, and preferably adjust, the housing at or to a desired angular orientation relative to horizontal. Various angle adjustment assemblies are conventional and/or well known and/or commonly employed in the prior art PAPIs and such prior art angle adjustment subassemblies may be employed in the present light assemblies.

The projection lens of the present light assemblies may be of any suitable configuration effective in providing the desired slope approach guidance. In one useful embodiment, the projection lens is a plano convex lens, preferably such a lens with the convex surface facing away from the mirror component.

The present PAPIs advantageously include a plurality of the present light assemblies as described herein. The plurality of assemblies is advantageously positioned to allow a single human observer to see the projection lens, or at least light passing through the projection lens, of each of the assemblies at the same time. In one embodiment, the plurality of assemblies is positioned so that the projection lens of each of the assemblies faces in substantially the same direction. The projection lenses of different light assemblies may be located at different angles from each other relative to horizontal. The plurality of light assemblies may include at least two assemblies positioned at different angles relative to horizontal. For example, in two-light PAPIs the two light assemblies are positioned at different angles relative to the horizontal to provide slope approach path guidance.

In other embodiments, the plurality of assemblies includes at least three of the assemblies or four assemblies positioned at different angles relative to horizontal. For example, in a four-light PAPI system, all four of the light assemblies are positioned at different angles relative to the horizontal. For example, each of the light assemblies may be positioned about 20 minutes or about one third of a degree (of an arc) from the next light assembly. This is in line with conventional or common practice used with currently used PAPIs and again is designed to allow the use of the present PAPIs in place of the currently used or prior art PAPIs with little or no disruption in operation or safety of the airport.

In certain instances, the plurality of assemblies include two or three or more assemblies positioned at substantially the same angle relative to horizontal. For example, in order to more clearly identify the signal or information desired to be given, two, three or more assemblies located in close proximity to each other at substantially the same angle relative to horizontal may be employed to provide that signal or information.

As with the current PAPIs the present PAPIs are advantageously positioned on or in proximity to an airport runway. Advantageously, the PAPIs are positioned in substantially identical positions as the currently used PAPIs. Such placement facilitates the present PAPIs being employed with little or no disruption to airport operation and safety.

Each and every feature described herein, and each and every combination of two or more of such features, is included within the scope of the present invention provided that the features included in such a combination are not mutually inconsistent.

These and other aspects and advantages of the present invention are apparent in the following detailed description, claims and drawings in which like parts bear like reference numerals.

DETAILED DESCRIPTION

Figure 1A:
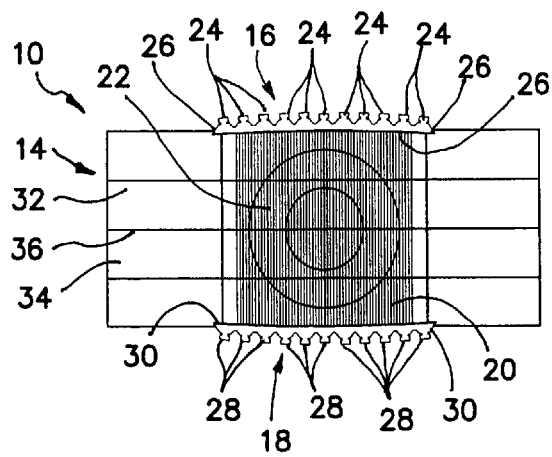
FIGS. 1(a), 1(b), 1(c) and 1(d) are somewhat schematic views of various components of an embodiment of a light assembly embodiment in accordance with the present invention.

Referring now to FIGS. 1(a)-1(d), a light assembly, shown generally at 10 includes a housing 12 which contains a mirror component 14, a first array 16 of white LEDs with encapsulated optics, a second array 18 of red LEDS with encapsulated optics, a horizontal spreader lens 20 and a projection lens 22. The forward end of the housing 12 is structured, for example, is transparent (preferably clear) or cut away, to allow light passing through the projection lens 22 from inside the housing to be seen from an appropriate distance, for example, in a range of about 5 miles to about 20 miles or more, away from assembly 10, for example, by a pilot in an aircraft approaching an airport for landing.

Each individual white LED 24 includes a collimating or encapsulating optic 26. Similarly, each individual red LED 28 includes a collimating or encapsulating optic 30. Such collimating or encapsulating optics 26, 30 are effective to provide a substantially focused beam of light from each of the LEDs 24, 28. LEDs with collimating optics are custom, while encapsulated optics may be readily fabricated, and such LEDs may be used in the present light assemblies.

The present light assembly 10 advantageously is structured to meet the requirements of aviation red. Such light assembly is structured to make effective and efficient use of LEDs.

The first array 16 of white LEDs 24 and the second array 18 of red LEDs 28 project white light and red light, respectively, onto mirror component 14. Mirror component 14 includes a first, substantially planar mirrored surface 32 and a second, substantially planar surface 34 which are disposed at an angle of 90° relative to each other and meet at a straight line edge 36. The light assembly 10 preferably is configured and/or structured so that light from the first array 16 of LEDs does not project onto second mirrored surface 34, and light from the second array 18 of LEDs does not project onto first mirrored surface 32. Advantageously, the first and second array of LEDs 16 and 18 are positioned within housing 12 at an angle of about 45° relative to the first and second mirrored surfaces 32 and 34.

Figure 1D:
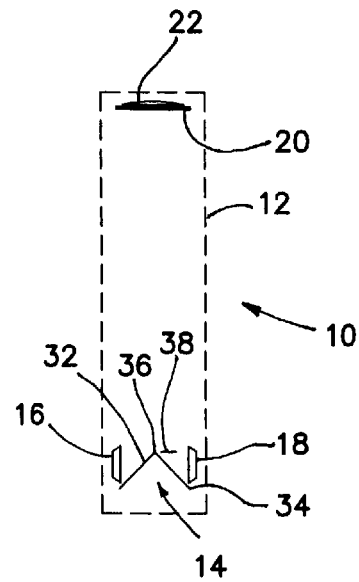
Figure 1B:
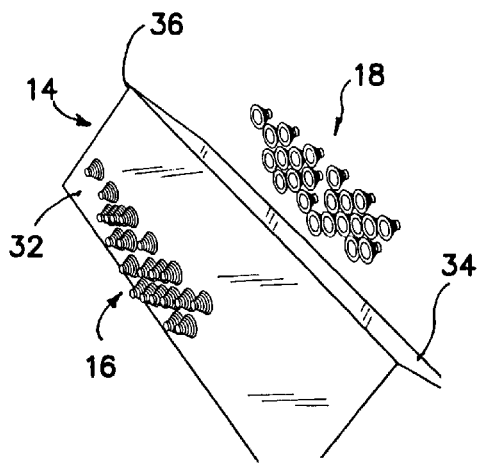
Figure 1C:
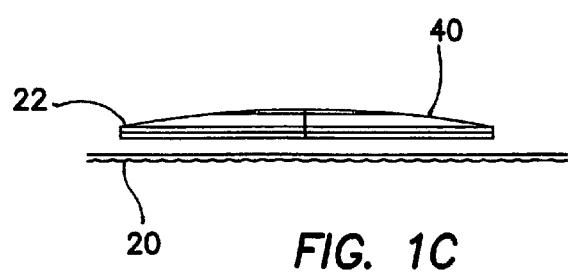

The straight line edge 36 of the mirror component 14 lies in a plane which is also located at an angle of 45° relative to the first and second mirrored surfaces 32 and 34. Such plane, shown as 38 in FIG. 1(d), is the plane which is imaged by the projection lens 22.

The mirrored component 14 is structured to allow or provide for a substantially sharp transition between the red and white light with the peak power at the cutoff line.

White and red light from first and second arrays 16 and 18 of LEDs, respectively, are projected onto first and second mirrored surfaces 32 and 34, respectively, and are reflected off such mirrored surfaces and travel to spreader lens 20 which is located just behind (or posterior of) projection lens 22. Spreader lens 20 is structured and effective in spreading light in the horizontal direction. In the absence of the spreader lens 20, the intensity or light pattern eminating from the projection lens 22 has a series of hot and cold spots corresponding to the spaced apart configuration of the first and second arrays 16 and 18 of LEDs.

After passing through, and being horizontally spread by the spreader lens 20, the reflected light then passes through the projection lens 20. Advantageously, the projection lens 20 is a plano-convex lens with the convex surface 40 facing away from the mirror component 14.

The mirror component 14 can be made from readily available materials. Advantageously, the first and second mirrored surfaces 32 and 34 are highly polished and/or otherwise structured and/or treated to enhance the ability of such surfaces to reflect light. Such enhanced reflectability, for example, relative to substantially identical mirrored surfaces without being highly polished and/or otherwise structured and/or treated, facilitates enhanced performance benefits for the present light assemblies and PAPIs.

The spreader lens 20 is fabricated and, projection lens 22 is commercially available and/or well known in the art.

The present light assembly 10 is structured to meet the requirement for translation from red to white, such requirements being red to white transition within 3 minutes of arc at beam center and 5 minutes of arc at beam edges and meet the requirement for light beam parallel to zero aiming angle of ±5 minutes of arc.

Figure 2:
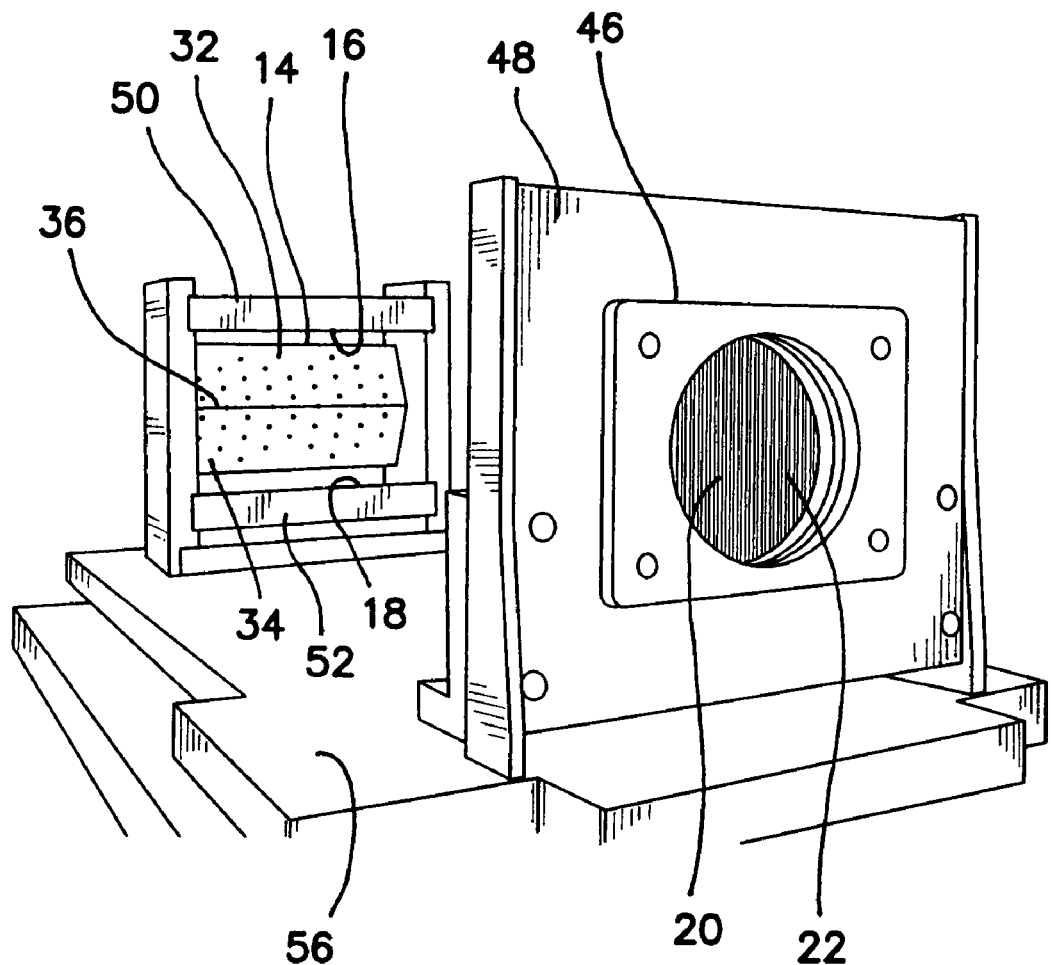
FIG. 2 is a perspective view of certain components of a light assembly in accordance with the present invention.

FIG. 2 shows a prototype of certain components of light assembly 10. In particular, light assembly 10 as shown in FIG. 2 does not include a portion of the housing, in order to more clearly show other components of the assembly. The spreader lens 20 and projection lens 22 are shown in the foreground of FIG. 2, secured to frame member 46 of housing element 48. Located in the background of FIG. 2 is mirror component 14 including mirrored surfaces 32 and 34 and straight line edge 36. A reflection of the first array 16 of LEDs is seen in first mirrored surface 32, and a reflection of second array 18 of LEDs is seen in second mirrored surface 34.

The first array 16 of LEDs is located in top member 50 and the second array 18 of LEDs is located in bottom member 52. Top member 50 and bottom member 52 are secured to the housing and hold the LEDs in fixed positions. A bottom platform member 56 is provided and is structured to be oriented at one of various angles relative to horizontal, for example, using any one of a number of conventional angular adjustment structures to properly align the angle of the assembly 10 relative to horizontal as desired to be effective in a PAPIs including a plurality of such assemblies.

Each of the light assemblies and the PAPIs of the present invention include additional components, for example, electrical components, such as power sources, wiring, regulators, switches, etc., which are conventionally employed to provide for proper functioning of equipment including the preferred LEDs. Since such additional components are conventional and/or well known in the art to be useful to provide such proper functioning, no detailed description of such additional components is presented here, it being understood that such additional components and the description thereof are well within the ordinary skill of the art.

To maintain a consistent luminous output and ensure high lumen maintenance from the light sources in the present light assemblies, a constant current source advantageously is employed to drive such light sources. This is particularly useful when using Pulse Width Modulation (PWM) to dim the light sources (e.g., LEDs). To achieve low parts count and high efficiency, two switched-mode buck regulators are employed in each light assembly 10 to drive each array of red and white LEDs. The buck regulators allow an external control source to modify the duty cycle of the PWM so that dimming is easily achieved. The high voltage DC required to drive the large number of series LEDs can be derived from incoming 240 Vac system power.

While this invention has been described with respect to various specific examples and embodiments, it is to be understood that the invention is not limited thereto and that it can be variously practiced within the scope of the following claims.

What is claimed is:

1. A precision approach path indicator system effective in providing approach slope guidance for aircraft approaching an airport runway, the system comprising
a plurality of light assemblies positioned on or in proximity to an airport runway, and structured to be effective in providing approach slope guidance light signals to a pilot of an aircraft approaching a runway, each light assembly comprising a first array of first light emitting diodes which emit light of a first color, a first mirrored surface positioned to reflect light emitted from the first array of first light emitting diodes, a second array of second light emitting diodes which emit light of a second color different from the first color, and a second mirrored surface positioned to reflect light emitted from the second array of second light emitting diodes, and a projection lens positioned to allow light reflected by the first and second mirrored surfaces to pass therethrough, provided that substantially no light emitted from the first array of first light emitting diodes is reflected from the second mirrored surface and substantially no light emitted from the second array of second light emitting diodes is reflected from the first mirrored surface.

2. The system of claim 1 wherein at least two of the assemblies are positioned at different angles relative to horizontal.

3. The system of claim 1 wherein four of the assemblies are positioned at different angles relative to horizontal.

4. The system of claim 1 wherein at least two of the assemblies are positioned at the same angle relative to horizontal.

5. The system of claim 1 wherein the first color is white and the second color is red.

6. The system of claim 1 wherein one or more of the first and second mirrored surfaces are substantially planar or curved.

7. The system of claim 1 wherein the first and second mirrored surfaces are substantially planar.

8. The system of claim 1 wherein the first and second mirrored surfaces are curved.

9. The system of claim 1 wherein the first and second mirrored surfaces are positioned at an angle of about 90° to each other.

10. A method of providing approach slope guidance for aircraft approaching an airport runway, the method comprising:

positioning a plurality of light assemblies on or in proximity to an airport runway, the plurality of light assemblies being effective in providing approach slope guidance light signals to a pilot of an aircraft approaching a runway, each light assembly comprising a first array of first light emitting diodes which emit light of a first color, a first mirrored surface positioned to reflect light emitted from the first array of first light emitting diodes, a second array of second light emitting diodes which emit light of a second color different from the first color, and a second mirrored surface positioned to reflect light emitted from the second array of second light emitting diodes, and a projection lens positioned to allow light reflected by the first and second mirrored surfaces to pass therethrough, provided that substantially no light emitted from the first array of first light emitting diodes is reflected from the second mirrored surface and substantially no light emitted from the second array of second light emitting diodes is reflected from the first mirrored surface.

11. The method of claim 10 wherein at least two of the assemblies are positioned at different angles relative to horizontal.

12. The method of claim 10 wherein four of the assemblies are positioned at different angles relative to horizontal.

13. The method of claim 10 wherein at least two of the assemblies are positioned at the same angle relative to horizontal.

14. The method of claim 10 wherein the first color is white and the second color is red.

15. The method of claim 10 wherein one or more of the first and second mirrored surfaces are substantially planar or curved.

16. The method of claim 10 wherein the first and second mirrored surfaces are substantially planar.

17. The method of claim 10 wherein the first and second mirrored surfaces are curved.

18. The method of claim 10 wherein the first and second mirrored surfaces are positioned at an angle of about 90° to each other.

* * * * *